(12) United States Patent
McCormick (10) Patent No.: US 12,449,210 B2
(45) Date of Patent: Oct. 21, 2025

(54) THERMAL ENERGY SYSTEM WITH BONDED AGGREGATE BLOCKS COMPRISING GRAPHITE

(71) Applicant: Photon Vault, LLC, San Ramon, CA (US)

(72) Inventor: Kentwell Lee McCormick, San Ramon, CA (US)

(73) Assignee: Photon Vault, LLC, San Ramon, CA (US)

( * ) Notice: Subject to any disclaimer, the term of this patent is extended or adjusted under 35 U.S.C. 154(b) by 443 days.

(21) Appl. No.: 17/823,073

(22) Filed: Aug. 29, 2022

(65) Prior Publication Data

US 2023/0064005 A1    Mar. 2, 2023

Related U.S. Application Data

(63) Continuation-in-part of application No. 17/012,621, filed on Sep. 4, 2020, now Pat. No. 11,428,476.

(51) Int. Cl.
*F28D 20/00*    (2006.01)
*F28F 21/02*    (2006.01)

(52) U.S. Cl.
CPC .......... *F28D 20/0056* (2013.01); *F28F 21/02* (2013.01); *F28D 2020/0069* (2013.01)

(58) Field of Classification Search
CPC ......... F28D 20/0056; F28D 2020/0069; F28D 2020/0013; F28F 21/02; F28F 21/04
See application file for complete search history.

(56) References Cited

U.S. PATENT DOCUMENTS

| | | | |
|---|---|---|---|
| 3,626,149 A | 12/1971 | Carney et al. | |
| 3,981,294 A | 9/1976 | Deminet et al. | |
| 4,044,825 A * | 8/1977 | Gugenberger | F28F 21/02 165/DIG. 396 |
| 4,085,333 A * | 4/1978 | Grise | F28D 20/0056 60/659 |
| 4,114,599 A | 9/1978 | Stephens | |
| 4,117,831 A | 10/1978 | Bansal | |
| 4,200,148 A | 4/1980 | Friefeld et al. | |

(Continued)

FOREIGN PATENT DOCUMENTS

CA    3019409 A1    10/2017
CN    202734275 U    2/2013

(Continued)

OTHER PUBLICATIONS

WO2012/140015 Machine Translation (Year: 2012).*

(Continued)

*Primary Examiner* — Travis Ruby
(74) *Attorney, Agent, or Firm* — Davis Malm D'Agostine PC; David J. Powsner (57) ABSTRACT

A thermal storage system includes a first block comprising (i) a bonded aggregate material, and (ii) between 0.01% and 10%, by weight, of graphite. A fluid transport via is disposed on or adjacent to at least a portion of an external surface of the first block and is in thermal coupling therewith. The fluid transport via presses against the first block with a force of at least 7 Newtons per meter. The graphite is disposed adjacent to at least said portion of said external surface so as to increase an aggregate rate of heat transfer over an entire volume of the first block.

27 Claims, 9 Drawing Sheets

(56) References Cited

U.S. PATENT DOCUMENTS

| | | | |
|---|---|---|---|
| 4,210,201 | A | 7/1980 | O'Hanlon |
| 4,257,398 | A | 3/1981 | Watson |
| 4,257,481 | A | 3/1981 | Dobson |
| 4,373,513 | A | 2/1983 | Materna |
| 4,946,526 | A * | 8/1990 | Petty-Galis ........ B29D 99/0014 156/196 |
| 4,953,627 | A * | 9/1990 | Ito ........................ C04B 37/005 428/116 |
| 4,966,226 | A * | 10/1990 | Hamburgen ........ F28D 15/0275 29/890.032 |
| 5,069,199 | A | 12/1991 | Messner |
| 5,382,387 | A * | 1/1995 | von Bonin ............... F28F 21/02 252/378 R |
| 6,106,789 | A | 8/2000 | Thompson |
| 6,264,736 | B1 * | 7/2001 | Knopf ................. C04B 40/0231 106/738 |
| 9,612,064 | B2 | 4/2017 | Langer et al. |
| 9,932,830 | B2 | 4/2018 | Laughlin |
| 10,288,357 | B2 | 5/2019 | Laughlin et al. |
| 2005/0051538 | A1 * | 3/2005 | Guckert ................. H05B 3/145 219/544 |
| 2006/0272796 | A1 | 12/2006 | Asmussen |
| 2008/0156314 | A1 | 7/2008 | Heuer et al. |
| 2008/0219651 | A1 * | 9/2008 | Nayef ................... F24H 7/0208 392/485 |
| 2009/0095282 | A1 | 4/2009 | Cramer |
| 2010/0314081 | A1 | 12/2010 | Reis |
| 2011/0286724 | A1 * | 11/2011 | Goodman ........... F28D 20/0056 165/104.31 |
| 2011/0290153 | A1 | 12/2011 | Abdullah |
| 2012/0060501 | A1 | 3/2012 | Hemrle |
| 2012/0199331 | A1 | 8/2012 | Maurer |
| 2012/0312292 | A1 | 12/2012 | Bahl |
| 2014/0060051 | A1 | 3/2014 | Ohler et al. |
| 2015/0000888 | A1 * | 1/2015 | Langer .................. E05F 15/643 156/60 |
| 2015/0226440 | A1 * | 8/2015 | Lipinski ................. F24D 3/165 165/47 |
| 2016/0108761 | A1 | 4/2016 | Frazier et al. |
| 2016/0160864 | A1 | 6/2016 | Becquin et al. |
| 2017/0275190 | A1 | 9/2017 | Eziyi et al. |
| 2019/0331098 | A1 | 10/2019 | von Behrens et al. |
| 2020/0031718 | A1 | 1/2020 | Düwel |
| 2020/0166290 | A1 | 5/2020 | Gattuso et al. |
| 2022/0074676 | A1 | 3/2022 | McCormick |

FOREIGN PATENT DOCUMENTS

| | | | |
|---|---|---|---|
| CN | 104556819 A * | 4/2015 | |
| CN | 210154394 U | 3/2020 | |
| DE | 10341299 A1 | 3/2005 | |
| DE | 102009014235 A1 | 9/2010 | |
| EP | 2241737 A1 | 10/2010 | |
| JP | H11294983 A | 10/1999 | |
| JP | 2001066081 A | 3/2001 | |
| JP | 2007085672 A | 4/2007 | |
| WO | WO 2012/114229 A1 | 8/2012 | |
| WO | WO 2012/140015 A1 | 10/2012 | |
| WO | WO 2015/129456 A1 | 9/2015 | |
| WO | PCT/US21/39287 | 6/2021 | |
| WO | PCT/US21/39288 | 6/2021 | |
| WO | PCT/US21/39289 | 6/2021 | |
| WO | PCT/US21/39290 | 6/2021 | |

OTHER PUBLICATIONS

CN-104556819 Machine Translation (Year: 2015).*
McCormick, U.S. Appl. No. 17/823,173, filed Aug. 29, 2022.
McCormick, U.S. Appl. No. 17/093,063, filed Nov. 9, 2020.
McCormick, U.S. Appl. No. 17/012,621, filed Sep. 4, 2020.
McCormick, U.S. Appl. No. 16/945,281, filed Jul. 31, 2020.
McCormick, U.S. Appl. No. 16/928,352, filed Jul. 14, 2020.
"Designing a novel solar-assisted heat pump system with modification of a thermal energy storage unit", Proceedings of the Institution of Mechanical Engineers Part A Journal of Power and Energy, May 2019.
"The Rayleigh-Benard problem in extremely confined geometries with and without the Soret effect," Platten et al., Comptes Rendus Mecanique, Elsevier Masson, 2007, 335 (9-10), pp. 638-654.10.1016/j.crme.2007.08.011.hal-01946148.
"Using Sand and other Small Grained Materials as Heat Storage Medium in a Packed Bed HTTESS", Schlipf et al., Energy Procedia, v. 69, pp. 1029-1038 (2015).
American Heritage Dictionary, 2nd Edition (1984), at p. 573.
Bernal, "The Structure of Graphite," Proceedings of the Royal Society of London. Series A, Containing Papers of a Mathematical and Physical Character, vol. 106, Issue 740, at pp. 749-773 (1924).
Bodzenta, "Thermal Properties of Compressed Expanded Graphite: Photothermal Measurements," Appl Phys B 105:623-630 (2011).
Brown, "Sodium Silicate Bonded Sand," Foseco Ferrous Foundryman's Handbook (Eleventh Edition), pp. 204-215 (2000).
Chemistry and Physics of Carbon, v. 1, Editor: Peter Thrower, Publ: Marcel Dekker, Inc. (1989) pp. 1-6.
Encyclopedic Dictionary of Condensed Matter Physics, v. 1, Charles P. Poole, Elsevier Ltd. (2004), pp. 530-533.
McEnaney, "Structure and Bonding in Carbon Materials," in Carbon Materials for Advanced Technologies (1999).
The Physical Chemistry of Materials—Energy and Environmental Applications (2010), Roque-Malherbe, CRC Press. pp. 86-88.
The Structure and Properties of Artificial and Natural Graphite, Neubert, et al., Argonne National Laboratory (1955) pp. 18-24.
International Search Report dated Dec. 14, 2021 for PCT/US21/39290, 20 pages.
International Search Report dated Dec. 8, 2021 for PCT/US21/39288, 7 pages.
International Search Report dated Sep. 13, 2021 in PCT/US2021/039287.
Search Report and the Written Opinion dated Nov. 5, 2021 in PCT/US2021/039289.
Opinion of the International Searching Authority, daed Oct. 31, 2023.
Extended Euroopean Search Report, dated Aug. 8, 2024.
Substantive Examination Report—Saudi Arabian Intellectual Property Office—dated Oct. 5, 2023—English Language Translation.
Research Report with Opinion on Patentability, dated May 4, 2023, Moroccan Intellectual Property Office—English Language Translation.
Resolution of Notification of the Expert Report, dated Feb. 3, 2025—Chilean Intellectual Property Office—English Translations.

* cited by examiner

THERMAL ENERGY SYSTEM WITH BONDED AGGREGATE BLOCKS COMPRISING GRAPHITE

This is a continuation-in-part of U.S. patent application Ser. No. 17/012,621, filed Sep. 4, 2020, the teachings of which are incorporated herein by reference.

BACKGROUND OF THE INVENTION

The invention relates to thermal energy storage. It has application to heat pumps and other systems that rely on the storage of thermal energy.

Energy storage is a critical capability for regulating the energy supply. For example, heat pumps that take advantage of renewable energy sources must accommodate a supply that is often intermittent and provides either too little or too much power relative to demand. Leveling out the supply of energy requires a mechanism to store and retrieve energy. For example, in industrial, and commercial and residential heat pumps there is a need for energy storage when excess thermal or electrical energy is available (e.g., during daylight hours) and for energy retrieval (e.g., during evening hours) when energy is needed for heating.

Sand has been proposed as a medium of thermal energy storage. See, for example, Schlipf et al, "Using Sand and other Small Grained Materials as Heat Storage Medium in a Packed Bed HTTESS," *Energy Procedia*, v. 69, pp. 1029-1038 (2015). Sand and the like have superior specific heat capacity and, as discussed by authors of that article, can be obtained cheaply. However, sand does not have good thermal conductivity, leading to inefficiency in heat storage and retrieval.

An object of the invention is to provide improved systems and methods for thermal energy storage.

A related object is to provide such improved systems and methods as can be used in thermal stores for heat pumps and other thermal energy systems.

A still further object of the invention is to provide such improved systems and methods as are economical and efficient.

SUMMARY OF THE INVENTION

The foregoing are among the objects attained by the invention which provides, in some aspects, a thermal storage system that includes a first block comprising (i) a bonded aggregate material, and (ii) between 0.01% and 10%, by weight, of graphite. A fluid transport via is disposed on or adjacent at least a portion of an external surface of the first block and is in thermal coupling therewith. The fluid transport via presses against the first block with a force of at least 7 Newtons per meter. The graphite is disposed in a vicinity of at least said portion of said external surface so as to increase by at least 50% an aggregate rate of heat transfer between that portion of the external surface and a remainder of the first block, e.g., where that aggregate rate of heat transfer is aggregated over an entire volume of the first block.

Related aspects of the invention provide a thermal storage system, e.g., as described above, wherein a combined elasticity E* of the first block and fluid transport via is less than 1.2 GPA, where E* is defined by the relation:

$$\frac{1}{E^*} = \frac{1-v_1^2}{E_1} + \frac{1-v_2^2}{E_2}$$

where,
$v_1$ is the Poisson ratio for the fluid transport via,
$v_2$ is the Poisson ratio for the storage block measured at the external surface in contact with the fluid transport via,
$E_1$ is the elastic modulus of the fluid transport via, and
$E_2$ is the elastic modulus of the storage block measured at the external surface in contact with the fluid transport via.

Further related aspects of the invention provide a thermal storage system, e.g., as described above, in which an aggregate contact deformation distance of the first block and the fluid transport via (i.e., the combined deformation of the first block and the fluid transport via, e.g., resulting from the fluid transport via pressing against the first block) is at least 7 nm.

Yet still further related aspects of the invention provide a thermal storage system, e.g., as described above, wherein at least 25% by weight of the graphite is disposed within 10% by volume of one or more regions of the first block in vicinity of one or more respective external surfaces of the first block against which one or more fluid transport vias are disposed.

Still yet further related aspects of the invention provide a thermal storage system, e.g., as described above, wherein the first block comprises a mixture of (i) the bonded aggregate material, and (ii) between 0.01% and 10%, by weight, of graphite having a pre-mix density of 0.1 to 2.0 g/cm^3.

Related aspects of the invention provide a thermal storage system, e.g., as described above, wherein the first block comprises (i) the bonded aggregate material, and (ii) between 0.01% and 10%, by weight, of graphite having an elastic modulus less than 1 GPa.

Other related aspects of the invention provide a thermal storage system, e.g., as described above, wherein the bonded aggregate material comprises sand.

Still other related aspects of the invention provide a thermal storage system, e.g., as described above, wherein the bonded aggregate material comprises sand and one or more of the silicate binder systems including sodium metasilicate, potassium metasilicate, lithium metasilicate, or an alkali activated geopolymer Further related aspects of the invention provide a thermal storage system, e.g., as described above, wherein (i) the graphite in the first block comprises over 50% planar six-membered hexagonal rings of carbon atoms, and (ii) in a region of the first block in a vicinity of the external surface of that block against which the fluid transport via is disposed, over 50% of said planar rings have normals oriented in parallel with a direction of the force against which the fluid transport via presses against that external surface.

Yet still further related aspects of the invention provide a thermal storage system, e.g., as described above, wherein the bonded aggregate materials is hardened by carbon dioxide or dehydration from heat or microwaves.

Still yet further related aspects of the invention provide a thermal storage system, e.g., as described above, wherein the fluid transport via comprises stainless steel.

Other aspects of the invention provide a thermal storage system, e.g., as described above, comprising a plurality of the above-described blocks, wherein at least pairs of the plurality of blocks are disposed adjacent one another (e.g., in a stacking arrangement, a side-by-side arrangement or otherwise), with one or more fluid transport vias disposed (i) between those adjacent blocks, and (ii) on or adjacent to a portion of respective external surfaces thereof.

Still other aspects of the invention provide a thermal storage system, e.g., as described above, in which the one or more fluid transport vias are disposed in a plane any of on, adjacent to, or in a said block, and in which a plurality of perforations extend through that block obliquely to the plane of the fluid transport vias. At least two of those perforations can be placed in fluid coupling with one another, e.g., by way of the ducting discussed below.

In related aspects, the invention provides a thermal storage system, e.g., as described above, that includes one or more end caps that are coupled to the block and that are in fluid coupling with two or more of the perforations.

Further related aspects of the invention provide a thermal storage system, e.g., as described above, wherein the end-caps are U-shaped tubes.

Still further related aspects of the invention provide a thermal storage system, e.g., as described above, wherein the graphite is concentrated in a vicinity of said plane.

Yet still further related aspects of the invention provide a thermal storage system, e.g., as described above, wherein the perforations facilitate heat transfer by any of conduction and convection.

In still yet further related aspects of the invention, the perforations are fluid-filled and the fluid is air or flue gas.

The invention provides, in still other aspects, a method of fabricating a thermal store by (A) placing one or more fluid-transport vias in thermal contact with a form of graphite, and (B) placing the graphite form in thermal contact with a bonded aggregate material.

In related aspects, the invention provides a method, e.g., as described above, wherein step (A) comprises placing the one or more fluid-transport vias in thermal contact with a layer of the graphite form, and step (B) comprises placing the layer of the graphite form in thermal contact with a layer of the aggregate material.

In further related aspects, the invention provides a method, e.g., as described above, wherein step (A) comprises compacting the layer of the graphite form after it is placed in thermal contact with the one or more fluid-transport vias, and step (B) comprises compacting the layer of the aggregate material after it is placed in thermal contact with the layer of the graphite form.

Still further related aspects of the invention provide a method, e.g., as described above, wherein the graphite form comprises expanded graphite.

Yet still further related aspects of the invention provide a method, e.g., as described above, wherein the vias comprise stainless steel.

Still yet further related aspects of the invention provide a method, e.g., as described above, wherein the vias comprise stainless steel tubes.

Other aspects of the invention provide a thermal storage system that has one or more fluid-transport vias that contain a heat transfer fluid and that are disposed in thermal coupling with a form of graphite, e.g., expanded graphite. The graphite form is, in turn, disposed in thermal coupling with a bonded aggregate material.

Related aspects of the invention provide a thermal storage system, e.g., as described above, in which the vias are disposed adjacent to and in thermal coupling with a layer of the expanded graphite or graphite form.

Further related aspects of the invention provide a thermal storage system, e.g., as described above, in which the layer of expanded or other graphite form is disposed adjacent to and in thermal coupling with a layer of the bonded aggregate material.

Still further related aspects of the invention provide a thermal storage system, e.g., as described above, in which the layers of the graphite form and/or bonded aggregate materials are compacted.

Yet further related aspects of the invention provide a thermal storage system, e.g., as described above, in which the vias comprise stainless steel and/or the heat transfer fluid comprises any of carbon dioxide, a eutectic mixture, heat transfer oils, perfluoropolyether (PFPE), hydrocarbons and/or refrigerant gases.

Other related aspects of the invention provide a thermal storage system, e.g., as described above, in which the bonded aggregate comprises concrete and/or a composite of sand and sodium metasilicate. In further related aspects, the bonded aggregate layer comprises perforations that extend obliquely through the respective layer.

The invention provides, in other aspects, methods of operating and/or fabricating a thermal store, e.g., of the type described above. One such method includes placing one or more fluid-transport vias in thermal contact with a form of graphite and, in turn, placing the graphite form in thermal contact with a bonded aggregate, such as, for example, concrete or a composite of sand and sodium metasilicate.

Related aspects of the invention provide a method, e.g., as described above, in which the graphite form and the aggregate comprise layers and, according to related aspects of the invention, compacted layers.

Still further related aspects of the invention provide methods, e.g., as described above, that include passing heated carbon dioxide through the one or more vias.

These and other aspects of the invention are evident in the text that follows and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Energy storage systems according to the invention consume heat from a heat transfer fluid and distribute that heat, using a heat "sink" such as a layer of expanded graphite, throughout a bulk medium of bonded aggregate material such as sand. The systems can take advantage of (i) the improved thermal conductivity of the bonded aggregate over the aggregate alone, yet, without the loss of thermal mass of the aggregate, and (ii) the superior thermal conductivity of the graphite heat spreader over the bonded aggregate. With respect to the latter, some embodiments take additional advantage of the still further improved conductivity of a heat spreader composed of graphite that has been expanded and compressed perpendicular to the plane of thermal conduction.

Systems according to the invention store and retrieve thermal energy quickly. Additional advantages include their absorption of large quantities of heat, even when there are small temperature differences between the heat source and the storage system. Moreover, heat can be extracted from the systems for a long period of time at near the charging temperature. These characteristics are desirable, by way of non-limiting example, for energy production from heat engines, which can produce more power when temperature are higher.

Systems according to the invention have application, by way of non-limiting example, in industrial, commercial and residential heat pumps and other apparatus that benefit from energy storage when excess thermal or electrical energy is available (e.g., during the daylight or off-peak hours) and from energy retrieval when energy is needed for heating or electricity production (e.g., during evening or peak hours).

Described below and shown in the drawings are embodiments of the invention having heat transfer fluid vias, heat spreader layers and bonded aggregate layers. It will be appreciated that this is by way of example and that other embodiments may utilize different bonded aggregated materials, different heat transfer fluids and vias, different heat spreader materials and/or different geometrical arrangements of vias, sinks and/or aggregates, whether layered or otherwise, all in accord with the spirit of the teachings hereof. Furthermore, multiple systems of the types shown and described here (or variants of those systems) may be combined in series or parallel or any combination thereof to extract and store heat from a common thermal energy source or from multiple disparate such sources and/or to discharge stored heat to a common thermal energy destination or to multiple disparate such destinations.

Architecture

Figure 1:
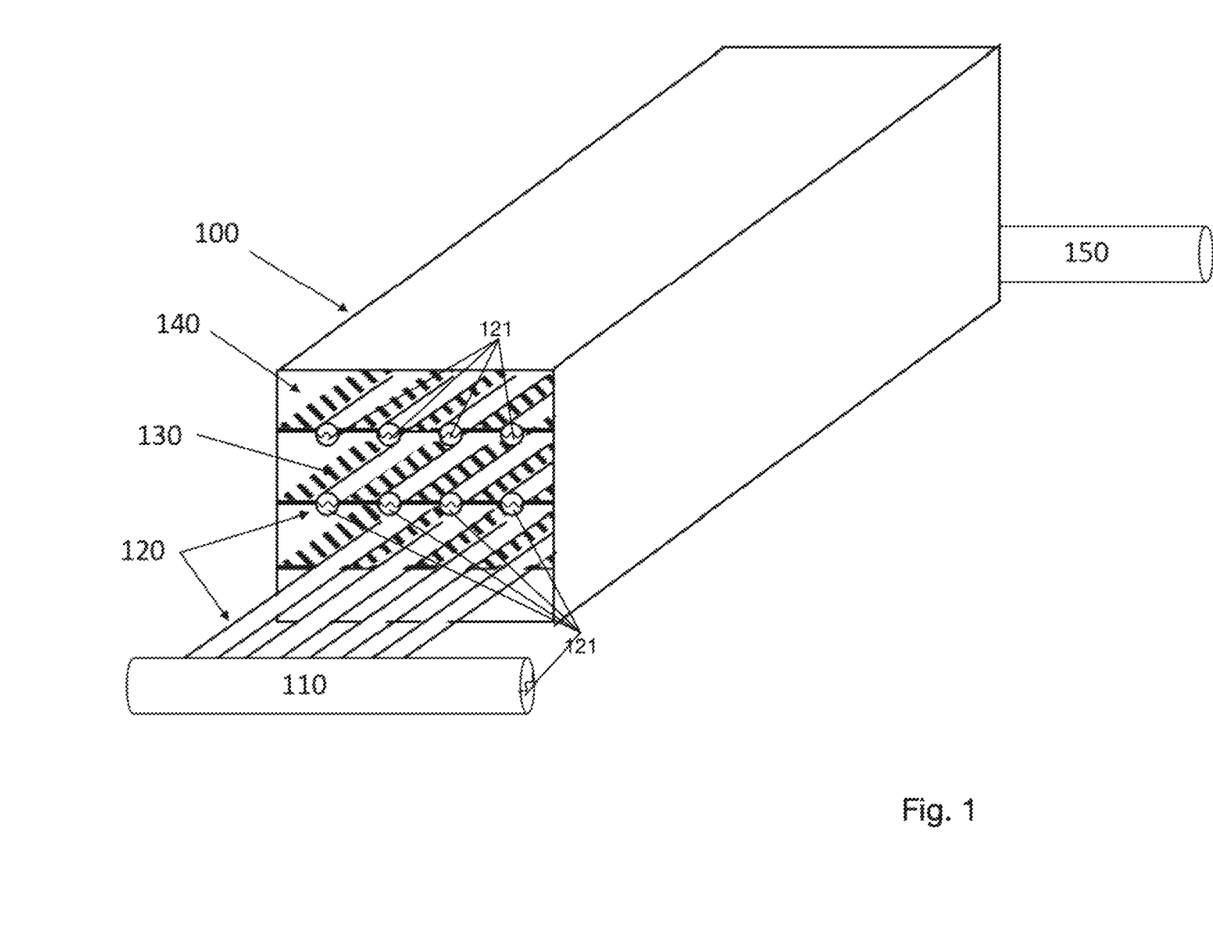
FIG. 1 depicts a thermal energy storage system according to one practice of the invention.

FIG. 1 is a perspective view of a heat store according to the invention including a housing 100, inside of which is disposed bonded aggregate medium 140 (also referred to herein as a "storage medium," "bulk medium," "medium," "storage material," "aggregate material," "aggregate," and the like) and extending through which medium 140, as shown, are fluid-transport vias 120 and heat spreader(s) 130. The heat spreader(s) 130 are in thermal contact with the vias 120 and with bonded aggregate medium 140 for purposes of transferring heat between them. The heat store of FIG. 1 is shown in cross-section in FIG. 5, which shows that the vias 120 reside between layers of storage material 140 which are faced with layers of heat spreader and that provide an interface that contacts both the vias 120 and the bulk storage material 140. The term "thermal storage system" is used interchangeably with "thermal energy store," "heat store," "store," and the like throughout this application.

A flow of heat transfer fluid through the vias 120 is supported by headers 110 and 150. Though only one pair of headers 110, 150 is shown in the drawing—to wit, in fluid coupling with vias 120 on a bottom layer of the housing 100 for purposes of supporting the flow of a heat-transfer fluid to (header 110) and from (header 150)—it will be appreciated that those headers 110, 150 may support the flow of heat transfer fluid with others of the illustrated vias 120 and/or that additional headers may be provided for that purpose.

The housing 100, which is shown here as being of square or other rectangular cross-section, may be of circular or other cross-section, whether or not regular. The housing may be fabricated of metal, plastic, ceramic, or other suitable material known in the art and may include, surround or be encased in insulative or other materials selected in accord with the environment in which the store is use, e.g., above- or below-grade, transportable or otherwise, all as is within the ken of those skilled in the art in view of the teachings hereof. The heat transfer fluid 121 of the illustrated embodiment is carbon dioxide as it is non-toxic, non-flammable, and suitable for high temperature heat transfer and as a working fluid in heat engines. However, those skilled in the art will appreciate that other substances, such as a eutectic mixture, e.g., of biphenyl and diphenyl ether, heat transfer oils, perfluoropolyether (PFPE), hydrocarbons, refrigerant gases or other heat-transfer fluids of the type known in the art, the selection among which is within the ken of those skilled in the art in view of the teachings hereof for the temperatures, pressures and other operating conditions of the embodiment, may be used instead or in addition to carbon dioxide.

Vias 120 and headers 110, 150 comprise conduits, headers, manifolds, piping, tubing or other structures (collectively, "tubes") of the type known in the art as adapted in accord with the teachings hereof to carry the heat transfer fluid 121 in its liquid and/or gas and/or supercritical phases through the storage system and its respective components as shown in the drawings and described herein. In the illustrated embodiment, the tubes are fabricated from stainless steel, though, other embodiments may use other metals, ceramics, plastics or composites thereof, all as is within the ken of those skilled in the art in view of the teachings hereof. Vias 120 reside wholly within the housing 100 or may protrude from it as shown, for example, in the case of the vias 120 on a bottom layer in FIG. 1 and as further shown in FIG. 3.

In addition to carrying the heat transfer fluid 121 and being thermally coupled to it, vias 120 are thermally coupled to heat spreader(s) 130 disposed within the housing, e.g., as shown in FIG. 1. In the illustrated embodiment, those heat spreader(s) 130 comprise one or more layers of expanded graphite powder, though, alternative embodiments may use of other graphite configurations and/or other compounds instead or in addition to graphite. Such thermal coupling is obtained in the illustrated embodiment by disposing the vias on and/or between layers of graphite 130 and applying force to the vias 120 and/or graphite layers 130 to insure robust contact. Alternatively, or in addition, the graphite layers 130 may be compacted before and/or after placement of the vias thereon or therebetween, all as is within the ken of those skilled in the art in view of the teachings hereof.

As noted, alternative embodiments may use heat spreader(s) 130 of configurations other than layered graphite powders. For example, in some such alternative embodiments, antenna-shaped or other dendritically-shaped graphite structures can be used as heat spreader(s) 130. These structures can be of small, particulate size or of larger size (e.g., from snowflake-sized or larger). Moreover, the structures can be layered in parallel with the layers of medium 140 discussed below or can extend obliquely from the vias 120 into those medium 140 layers, all as is within the ken of those skilled in the art in view of the teachings hereof.

In addition to being in thermal contact with the heat spreader(s) 130, the vias 120 can be in thermal contact with the bonded aggregate medium 140 that is also disposed within the housing 100, e.g., as shown in FIG. 1. As above, this can be achieved by disposing the vias 120 on or between layers of the medium 140 and applying force or compaction as described above vis-à-vis achieving thermal coupling between the vias 120 the heat spreader(s) 130.

Figure 5:
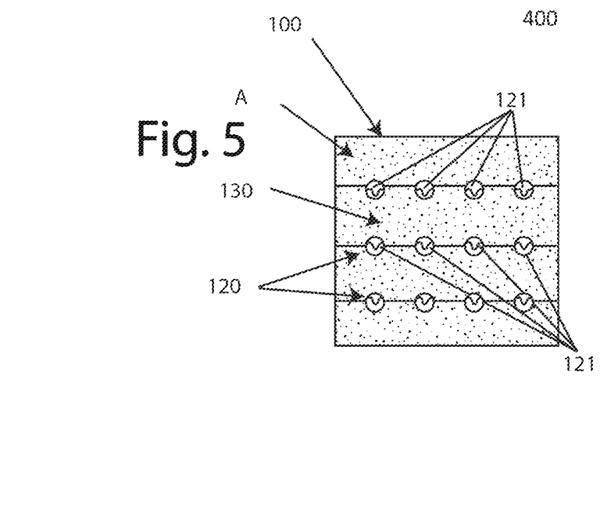
FIG. 5 is a cross-sectional view of the thermal energy storage system of FIG. 1.

In the illustrated embodiment, heat transfer between the vias 120 and the medium 140 is preferentially attained via the heat spreader(s) 130 and not via direct contact between the vias and that medium. To this end, heat spreader(s) 130 of the illustrated embodiment are in thermal coupling with the medium 140. In embodiments in which the heat spreader(s) 130 comprise graphite layers, such thermal coupling is achieved by disposing each layer of graphite on or otherwise in contact with the medium 140, which itself may be compressed and disposed in layers in housing 100, as shown in FIGS. 1 and 5.

As noted above, the heat spreader graphite layer 130 thermally couples the heat transfer fluid 121 in vias 120 to the bonded aggregate (or "bulk") medium 140. In the illustrated embodiment, the graphite layer 130 is formed from graphite that has been processed into its "expanded" form a/k/a "expanded graphite"—a material with very low density. During fabrication of the illustrated system of FIG. 1, the expanded graphite 130 is compressed onto the bonded aggregate medium 140 to form a heat spreader layer with higher density. Compression, moreover, aligns the planes of graphite (i.e., the planar six-membered hexagonal rings—a/k/a "planes"—of carbon atoms that make up the graphite) so that they are perpendicular to the direction of compression. When aligned in this way, the thermal conductivity in the plane perpendicular to the compression direction is much higher than in bulk graphite and can exceed the thermal conductivity of metallic materials. It is this property that enables the vias 120 to thermally couple with the bulk medium 140 by way of the graphite heat spreader layer 130.

The bulk medium 140 of the illustrated embodiment is a bonded aggregate material, particularly, bonded sand. This may be concrete (to wit, a mixture inter alia of sand and cement) or a composite formed from sand bonded with a silicate such as sodium, potassium, or lithium metasilicate or combinations thereof. It may also be a so-called geopolymer materials wherein an alkali activator such as sodium hydroxide catalyzes the polymerization of silicon and aluminum oxides. In one embodiment, such a composite is formed by mixing sodium metasilicate, a liquid consisting of water and silicon dioxide and disodium oxide in a ratio of between 1.8 and 3.4, with the sand and forming it into layers within the housing 100 in contact with the graphite heat spreader layers 130. Over an extended period of time, the sand/metasilicate mixture will harden. The hardening can be accelerated to just a few seconds by exposing the mixture to carbon dioxide gas or by heating with hot air or microwaves. Unlike most binders, sodium metasilicate is a refractory material capable of handling temperatures in excess of 600 degrees Fahrenheit. Regardless of whether in concrete or a sodium silicate composite, the bonded aggregate has improved thermal conductivity over sand itself and it provides the requisite rigidity to enable compression with the graphite layers 130. Other embodiments of the invention may utilize bulk medium layers 140 that utilize, in lieu of sand, other aggregate materials of comparable heat capacity (e.g., stone) and/or that utilize, in lieu of cement or sodium metasilicate, other compounds to bond the sand or other aggregate material, all as is within the ken of those skilled in the art in view of the teachings hereof.

In some embodiments, one or more of the bulk medium layers 140 (whether in block form, as discussed below, e.g., in connection with FIGS. 8A-8C and 9A-9B, or otherwise) is perforated as shown as item 400 of FIG. 4. Such a perforated layer 400 may be fabricated as discussed above, albeit with a (large) plurality of holes 410 that run obliquely (or, more particularly, for example, normal) to the plane of (i) the respective layer 400 (which plane is connoted, here, by x-y axes) and (ii) the fluid transport vias 120—or, put another way, holes that run from and between the layers 130 with which the perforated layer 400 is in physical contact.

Whereas the primary mechanism of heat transfer in the layers 140 is conduction, the primary mechanism of heat transfer in the perforated sand layer 400 is convection. Convective heat transfer enables much thicker layers of bulk sand while maintaining good heat transfer performance. The limit to the slab thickness is governed by the Rayleigh number. Critical values of the Rayleigh number for vertical cavities are known in the art, e.g., as described in Platten, et al, "The Rayleigh-Benard problem in extremely confined geometries with and without the Soret effect," Comptes Rendus Mécanique, Elsevier Masson, 2007, 335 (9-10), pp. 638-654. 10.1016/j.crme.2007.08.011. hal-01946148.

Figure 4:
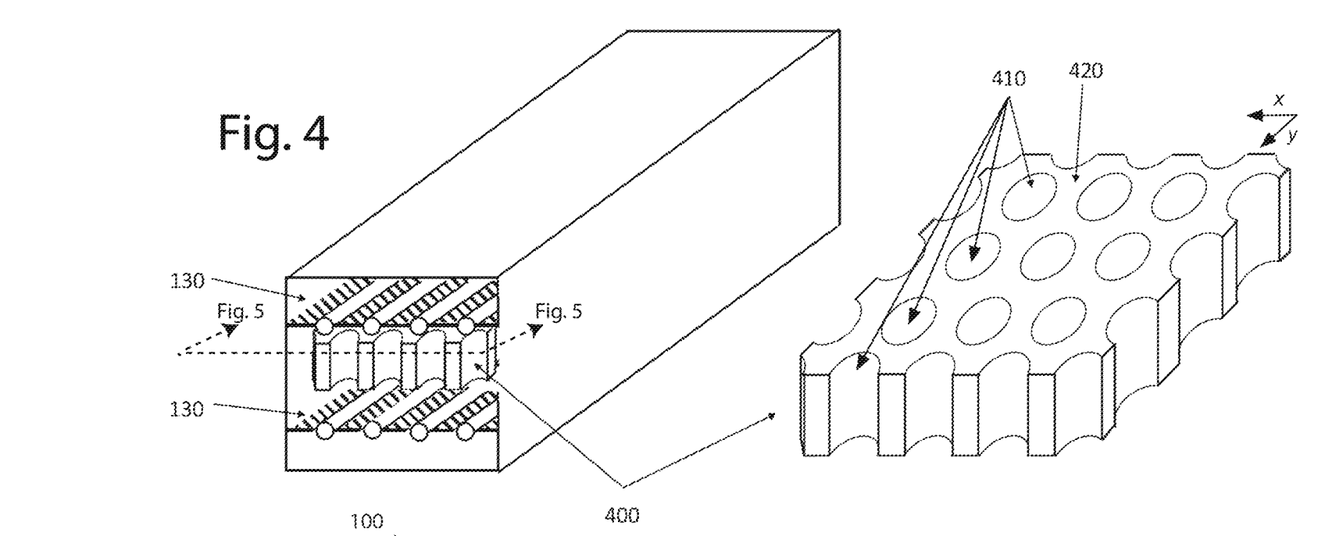
FIG. 4 depicts the system of FIG. 1 with a perforated sand layer in between aggregate medium and heat transfer layers.
Figure 6:
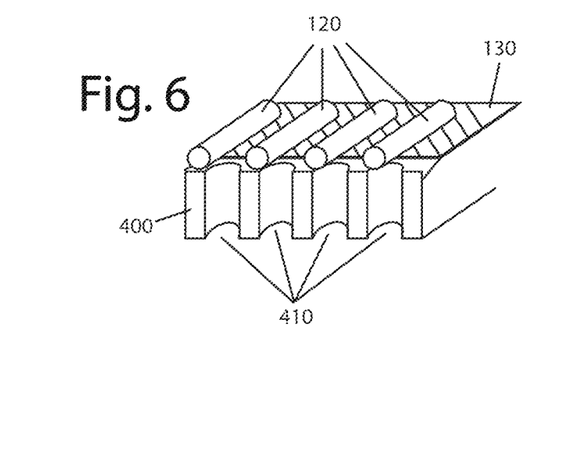
FIG. 6 is a perspective view of a bulk medium layer and the heat spreader and vias disposed adjacent thereto in an embodiment of the type shown in FIG. 4.

FIG. 6 is a perspective view of a bulk medium layer 400 and the heat spreader 130 and vias 120 disposed adjacent thereto in the embodiment of FIG. 4.

Figure 7:
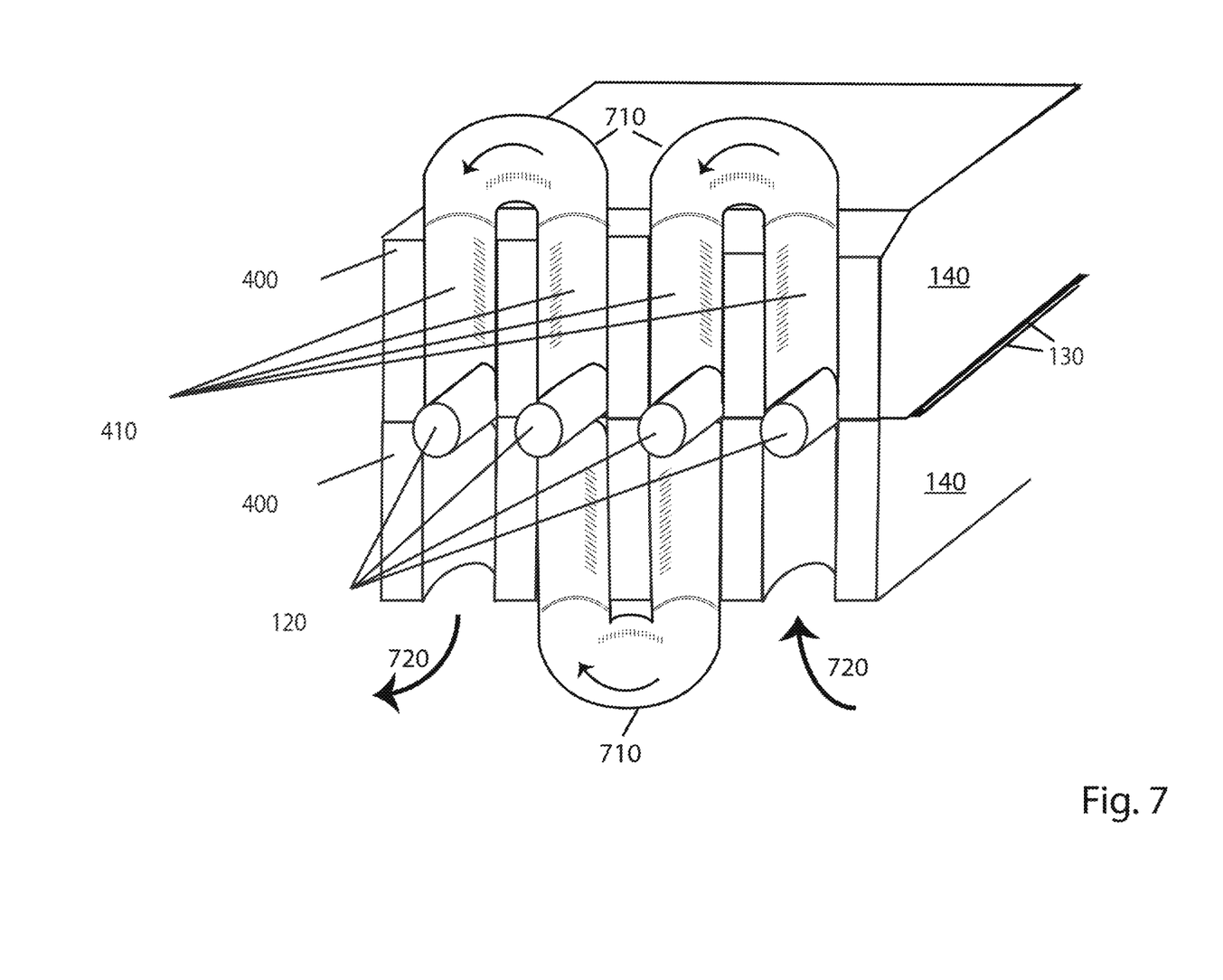
FIG. 7 depicts a system according to the invention that utilizes hot gas passing through the perforations to charge the aggregate medium.

FIG. 7 depicts a heat store of the type shown in FIGS. 4 and 6 that additionally includes ducting 710. In this configuration the perforations 410 in the storage media 400 carry a stream of gas 720 that heats the surrounding storage media through convection or conduction. The gas can originate from any heat source including, for example, flue gas, and traverse the storage in a direction perpendicular to the flow of the fluid in the vias, 120. Once the gas exits the perforation on the top or the bottom, it is channeled to another perforation with a connecting U bend. The flow direction from perforation to perforation may be configured to be either across the flow of the fluid in the vias (i.e., from one via 120 to the next, as shown in the drawing) or counter flow to the fluid in the vias (i.e., from one perforation 410 in vicinity to a given via 120 to another perforation 410 in vicinity of an up- or down-stream region of that same via 120). Ducting of the type shown in FIG. 7 can be used, as well, in connection with the embodiments discussed below in connection with FIGS. 8A-8C and 9A-9B.

Operation

As the heat transfer fluid 121 flows through each via 120 during the "charging" phase of operation of the store of FIGS. 1 and 4-7, it transfers heat through the walls of the via to one or more graphite heat spreader layers 130 on/in between which that via is disposed and, in turn, to the bonded aggregate medium 140 on which those heat spreader layers 130 are disposed. Conversely, during discharging, heat from the bonded aggregate medium 140 is transferred through the graphite heat spreader layers 130 to the heat transfer fluid contained in the vias 120 through the walls thereof. In practice, whether a phase is a charging or discharging phase depends on the local temperature difference between the heat transfer fluid in via 120 and that of the graphite heat spreader layer 130 and bonded aggregate medium 140 adjacent it.

Figure 2:
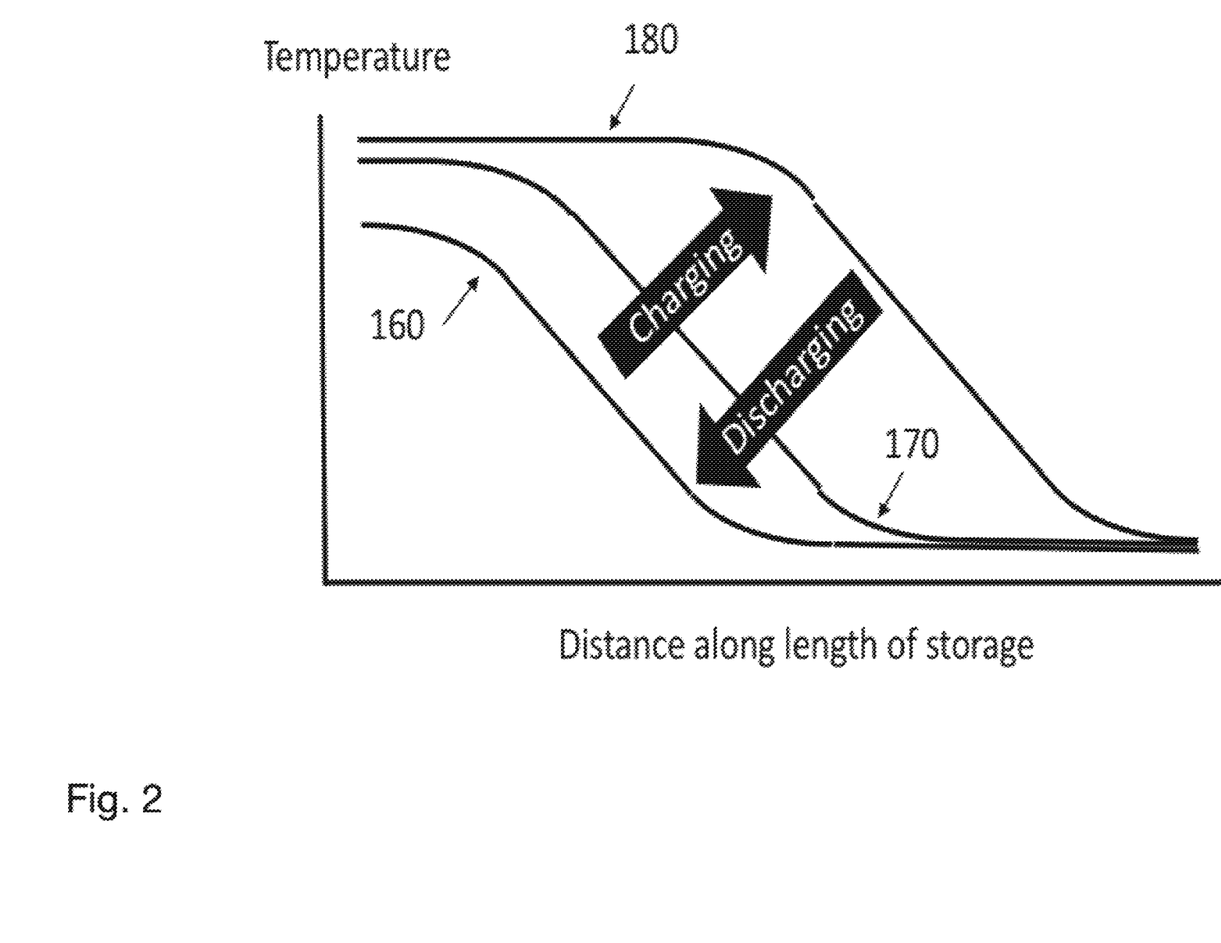
FIG. 2 depicts a thermal storage temperature profile of the system of FIG. 1.

FIG. 2 illustrates the typical thermal gradients that are seen in the heat storage systems (or "stores") of FIGS. 1 and 4-7 during charging and discharging. The x-axis of the drawing corresponds to the traversal of the tubes from header 110 to vias 120 to header 150.

At the beginning of the charging cycle, the temperature profile is as illustrated as curve 160. The temperature near the inlet is high, but lower than the temperature of the heat transfer fluid 121. This enables heat to flow from the heat transfer fluid into the graphite heat spreader layer 130 and, then, to the bonded aggregate 140. As the fluid traverses the via 120, its temperature decreases because it has a finite specific heat. The corresponding temperature in the bonded aggregate 140 and heat spreader layer 130 of the store as illustrated by curve 160 also declines. This enables to the fluid 121 to continue to deposit heat into the store until the heat transfer fluid temperature reaches the minimum of the curve. At that point, the fluid 121 flows to the exit at that minimum temperature.

Over time, the temperature of the medium 140 in the store will increase and resemble curve 170. In this condition, the heat transfer fluid 121 will not initially transfer much heat as it enters the store 140. It will have to traverse some longitudinal distance before the temperature in the store drops to a sufficient level for heat transfer to begin. Then, as before, heat will flow from the fluid to its surroundings and the fluid 121 will eventually approach the minimum temperature of curve 170. It will exit the store at that temperature.

In some preferred embodiments, the thermal stores of FIGS. 1 and 4-7 will be charged until the profile approaches curve 180 of FIG. 2. At this point, the heat transfer from the fluid 121 will occur in roughly that latter half of the store. Continuing to charge beyond this point is possible and no particular harm will come to the store, but for the purpose of constructing a system for efficient round-trip storage and retrieval system for electrical energy, the increased thermal charge will lead to inefficiencies. The inefficiency is manifest through the creation of entropy when low temperature fluid is re-injected to the system during discharging. By stopping at curve 180, the fluid 121 in the discharge process enters with a relatively small temperature difference relative to the thermal store. The fluid 121 extracts heat as it traverse curve 180 (now from right to left) until it saturates near the maximum temperature of curve 180.

Discharging proceeds much like charging except that the curves now progress from 180 to 170 to 160. For much of the discharge cycle, the heat transfer fluid is able to exit at nearly the same temperature as the fluid that entered the storage system during the charging phase. This enables the storage systems of FIGS. 1 and 4-7 to retrieve the stored thermal energy with relatively limited entropy creation and thus high efficiency. It will be noted that over long time scales, the curve 180 will eventually reach an equilibrium where the temperature gradient vanishes. By designing the store with a sufficiently long length, the effect of this equilibration can be made small enough that it does not materially impact storage performance over the time scale of days or weeks. In cases where it is desirable to have even longer term storage, a network of storage units can be deployed with associated valves to build a discretized version of the curves illustrated in FIG. 2 and thereby prevent the equilibration of heat beyond each discrete storage system.

Figure 3:
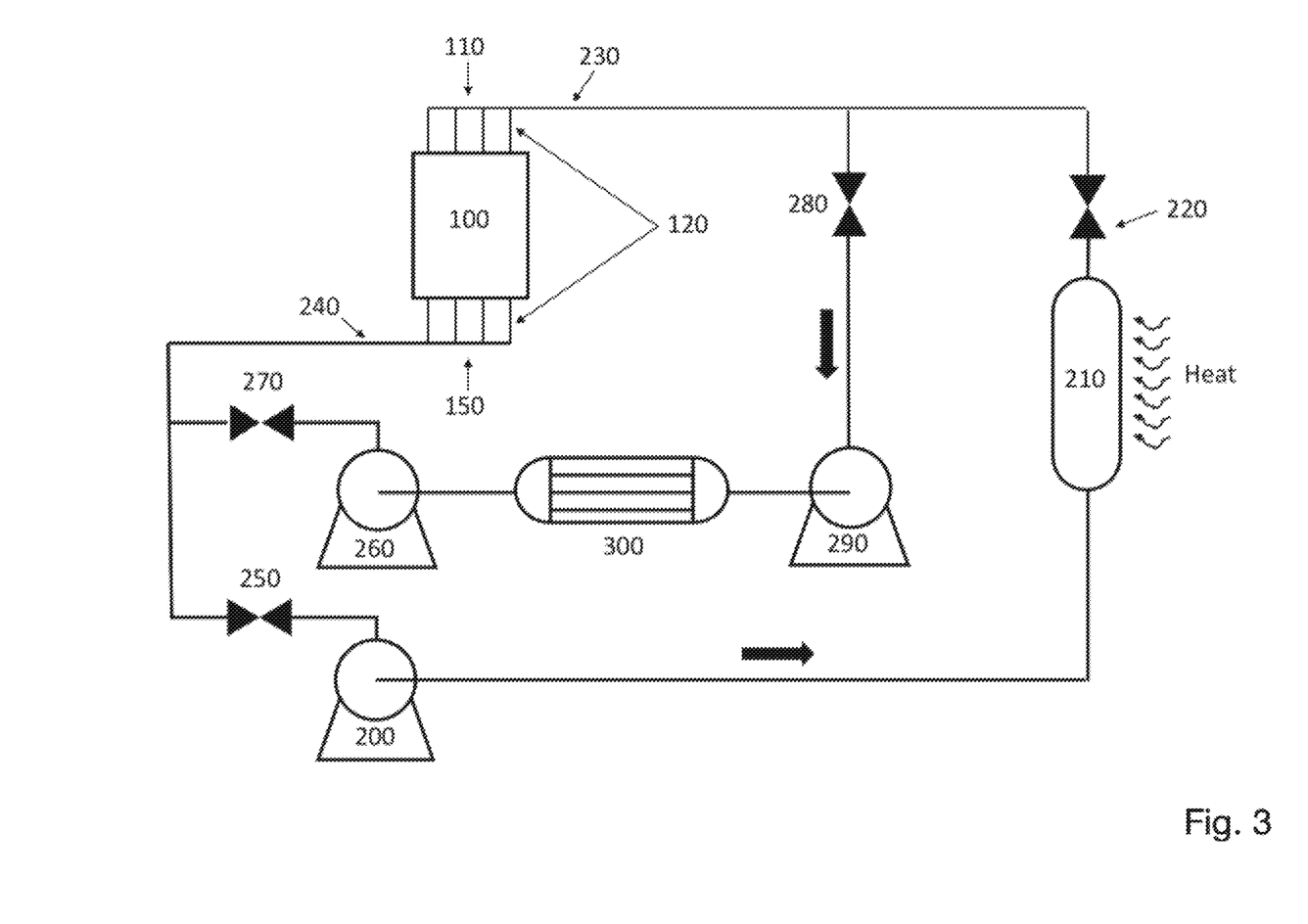
FIG. 3 depicts a system according to the invention using the thermal energy store of FIG. 1.

FIG. 3 is an example of a system according to the invention using the thermal energy stores of FIGS. 1 and 4-7. The store is denoted by its housing 100, headers 110, 150 and vias 120 in the drawing. The store and other components of the system of FIG. 3 are coupled by piping, conduits, tubing and other structures (here, again, collectively, "tubes") of the type known in the art suitable for defining a fluid path (or circuit) and carrying the heat transfer fluids along the paths illustrated in the drawings and described below. The path and those structures are depicted as tubes in FIG. 3 by solid lines and directional arrows as per convention.

Consider, first, the process for charging the thermal store. The pump 200 moves the heat transfer fluid through pipes to a heat collector 210. The fluid gains heat and increases in temperature in a heat collector 210, which is of the conventional type known in the art as adapted in accord with the teachings hereof.

The heat collector 210 connects to valve 220, which is open in the charging state. Valve 220 connects to valve 280 which remains closed during the charging cycle. The heat transfer fluid flows through pipe 230 and connects to header 110 of the thermal store. As described above, heat is transferred from the heat transfer fluid into the bulk medium of the thermal store as the fluid flows through tubes 120 to the header 150. The aforementioned valves 220, 280, as well as the others shown in FIG. 3 and discussed herein, are of the conventional type known in the art as adapted in accord with the teachings hereof.

The header 150 connects to external tubes 240, which may be arranged in a piping network or otherwise as is within the ken of those skilled in the art in view of the teachings hereof. Those tubes convey the heat transfer fluid to valves 270 and 250. During the charging cycle valve 270 remains closed and valve 250 is open. Valve 250 conveys the heat transfer fluid to the pump 200 which completes the cycle.

During discharging, valves 250 and 220 are closed and valves 270 and 280 are open. The fluid path illustrated in the diagram depicts a Rankine cycle for converting the stored thermal energy into electrical energy. Beginning with the pump 260, the fluid flows through 270 to the piping network 240 and into the thermal store. As described above, when the heat transfer fluid traverse the thermal store, it will increase in temperature until it is nearly the same temperature as the fluid used to charge the store. The fluid will then flow from the store through header 110 and tubes 230 (which, too, may be arranged in a piping network or otherwise) to valve 280. This valve will convey the fluid to turbine 290, which is of the conventional type known in the art as adapted in accord with the teachings hereof. The turbine extracts mechanical energy from high temperature fluid and lowers its temperature. The mechanical energy can be used directly or to power an electrical generator (not shown) of the conventional type known in the art as adapted in accord with the teachings hereof. Having transferred its usable energy, the low temperature fluid exits turbine 290 and enters condenser 300, e.g., of the type known in the art as adapted in accord with the teachings hereof.

The condenser 300 transmits heat from the fluid to an external heat sink such as the air via a cooling tower, e.g., of the type known in the art as adapted in accord with the teachings hereof. During this process the fluid condenses to its liquid state. From the condenser, the liquid fluid enters pump 260, too, of the conventional type known in the art as adapted in accord with the teachings hereof, and completes the cycle.

Operation of the pumps, valves and other active components of the system of FIG. 3, as described above and elsewhere herein, during charging and discharging cycles or otherwise may be effected "by hand" by an operator (not illustrated), by machine, e.g., by a digital data processor, PLC or other control devices or combination thereof (not illustrated), or by a combination of man and machine, all as per convention in the art as adapted in accord with the teachings hereof.

The embodiments of the invention shown in FIGS. 1 and 4-7 and described above provide=systems that are well suited for rapidly charging and discharging the thermal store. The rate of charge can be tuned with the thickness of the sand layers, the thickness of the graphite, and the density of tubes. However, increasing the charging rate at a fixed temperature difference will increase the cost of the system. Similarly, reducing the charging rate will reduce the cost of the system. As an example, consider the sand layer. Doubling the thickness will enable the system to store twice as much thermal energy but the charging rate will fall by a factor of two. The geometry illustrated in FIG. 4 provides a way to maintain the charging rate as the thickness of the sand layer increases.

Fabrication

In some embodiments, a heat store, e.g., as shown in FIGS. 1 and 4-7, is fabricated by placing successive layers of aggregate medium 140, heat spreader 130 and fluid-transport vias 120 within a housing 100 or a form (e.g., in the manner of a temporary "concrete form" of the type known in the construction trades) that is disposed on-site or in a factory (for subsequent transport to the site) or otherwise. Thus, for example, a layer of medium 140 can be placed in the housing or a form, a layer of heat spreader 130 on top of the medium 140, and a layer of fluid-transport vias 120 on top of the heat spreader. That can be followed by a further layer of medium 140, optionally, preceded by a further layer of heat spreader 130. And, on top of that further layer of medium, another layer of vias 120, and so forth, until the housing or form is sufficiently filled. Each of the aforesaid layers can be compressed, e.g., by a roller or otherwise, as it is laid down and/or multiple layers can be compressed at once, thereby, causing the planes of graphite to align perpendicular to the compression direction and, thus, to increase the thermal conductivity in that perpendicular direction. In some embodiments, the multiple layers that fill the housing or form are hardened in the manner discussed above concurrently with one another, once they have been compressed.

In other embodiments, the aggregate medium 140 is pre-formed into blocks that may be regularly shaped (e.g., as cubes or rectangular parallelepipeds or otherwise), irregularly shaped or otherwise, and that may include perforations, indentations, projections or otherwise, to accommodate fluid-transport vias and/or to facilitate stacking, side-by-side placement or other assembly with other such blocks. Heat stores in accord with the embodiments of FIGS. 8A-8C and 9A-9B are fabricated by pre-forming at least one, if not multiple, blocks of aggregate medium 140, as discussed below.

Pre-forming of such blocks can be done on-site or in a factory (for subsequent transport to the site) or otherwise. For example, in a fabrication process that parallels that described immediately above vis-à-vis FIGS. 1 and 4-7, each layer of aggregate medium 140 can be hardened as it is laid down (i.e., rather than after all or multiple such layers have been laid down), thereby, forming that layer into a unitary block (or "pre-formed block" as those terms are interchangeably used) that is distinct from blocks formed from previously laid-down and hardened such layers, as well as from subsequently laid-down and hardened ones.

In some embodiments, heat spreader layers 130 are incorporated into the pre-formed blocks (e.g., so as to form unitary structures therewith) and are concentrated at the surfaces or other regions adjacent where they (the blocks) will come into thermal contact with the fluid-transport vias in the assembled heat store. In embodiments where the heat-spreader is graphite, such a block can comprise (i) a bonded aggregate material, and (ii) between 0.01% and 10%, by weight, of graphite—at least 25% by weight of which graphite is disposed within 10% by volume of the one or more regions of that block which will be in the vicinity of fluid transport vias in the assembled heat store.

For example, in embodiments where the heat store is assembled from a plurality of such blocks, with at least pairs of them disposed adjacent one another (in a stacking arrangement, a side-by-side arrangement or otherwise), e.g., in the manner shown in FIGS. 7 and 8A-8C, and with one or more fluid transport vias 120 disposed (i) between those adjacent blocks, and (ii) on or adjacent to portions of respective external contact surfaces thereof, at least 25% by weight of the graphite in each block is disposed within 10% by volume of regions of that block in the vicinity of those portions of the respective external contact surfaces.

Without deviating from the spirit hereof, in some embodiments, the heat spreader layers are not incorporated into the pre-formed blocks per se (e.g., so as to form unitary structures with them) but, rather, are sprayed, sprinkled or spread on, blown into cavities of or otherwise distributed on or in the aggregate medium that make up those blocks, e.g., after they have been hardened into block form. In such embodiments, the graphite is utilized in amounts and concentrations as described above (e.g., 0.01%-10% by weight of the combined weight of the block and associated heat spreader layers; 25% by weight within 10% by volume, where "weight" and "volume" as used here are the combined weight and volume of the block and associated heat spreader layers) and may be held in place by friction, adhesives, gravity or otherwise, all as within the ken of those skilled in the art in view of the teachings hereof.

In the discussion that follows, the term "block" refers to pre-formed blocks of storage medium 140 into which heat spreader layers (e.g., graphite) have been incorporated, as well as pre-formed blocks onto or into which such heat spreader layers have been distributed but not incorporated. In the latter case, "block" refers not only to the pre-formed block of storage medium but also the associated heat spreader layers 130, i.e., those heat spreader layers that are in contact with the pre-formed block.

Improved Heat Transfer

As noted in the discussion of FIG. 5, above, the vias 120 of a heat store according to the invention can reside between layers of storage material 140 which is faced with layers of graphite 130. These layers of graphite provide an interface that contacts both the via 120 and the bulk storage material 140. There are two considerations for this geometry to obtain good performance as a storage system. The first is the heat transfer from the via 120 to the contacting surface of the storage material 140. The second is the heat transfer from the contacting surface to the bulk of the storage material.

To improve the heat transfer from the vias 120 to the contacting surface of the medium 140, the contact area between the vias 120 and the storage material 140 should be enlarged and the contact resistance reduced. One way to accomplish this, in a manner that is effective notwithstanding temperature (and, therefore, dimensional) changes of the vias 120 and medium 140, is to press the vias 120 against pre-formed blocks of the medium 140, e.g., via application of weight, clamping or another force. So long as any of the vias 120, the blocks and/or the intervening graphite layers are sufficiently compliant, suitable deformation of one or more of these can be attained so as to provide such increased contact throughout operational temperature ranges and, therefore, increased heat transfer.

FIGS. 8A-8C and 9A-9B depict configurations of such pre-formed blocks 140' (including graphite heat spreader layers) that can be used in lieu of the storage medium 140 in the embodiments of FIGS. 1 and 4-7 in order to achieve such deformation (and, thereby, improved heat transfer) in heat stores according to the further aspects of the invention. In FIGS. 8A-8C and 9A-9B, the pre-formed blocks 140' are fabricated from the same materials as storage medium 140, albeit, as adapted in accord with the discussion above, e.g., under the heading "Fabrication."

Before turning to the discussion of FIGS. 8A-8C and 9A-9B, it will be appreciated that for elastic materials, the deformation can be calculated using the standard formula for the contact area of two cylinders of radii $r_1$, $r_2$ with elastic modulus $E_1$ and $E_2$ and Poisson ratio $v_1$ and $v_2$. The governing equations are:

$$1/r = 1/r_1 + 1/r_2 \quad (1)$$

$$1/E^* = (1-v_1^2)/E_1 + (1-v_2^2)/E_2 \quad (2)$$

$$F/L = (p/4) d\, E^* \quad (3)$$

$$a^2 = r\, d \quad (4)$$

where F/L is the force per unit length, d is the depth of the deformation due to the force, E* is the combined elastic modulus, r is the combined radius and a is one-half the width of the contact area (and, therefore, 2a is the contact width).

Figure 8A:
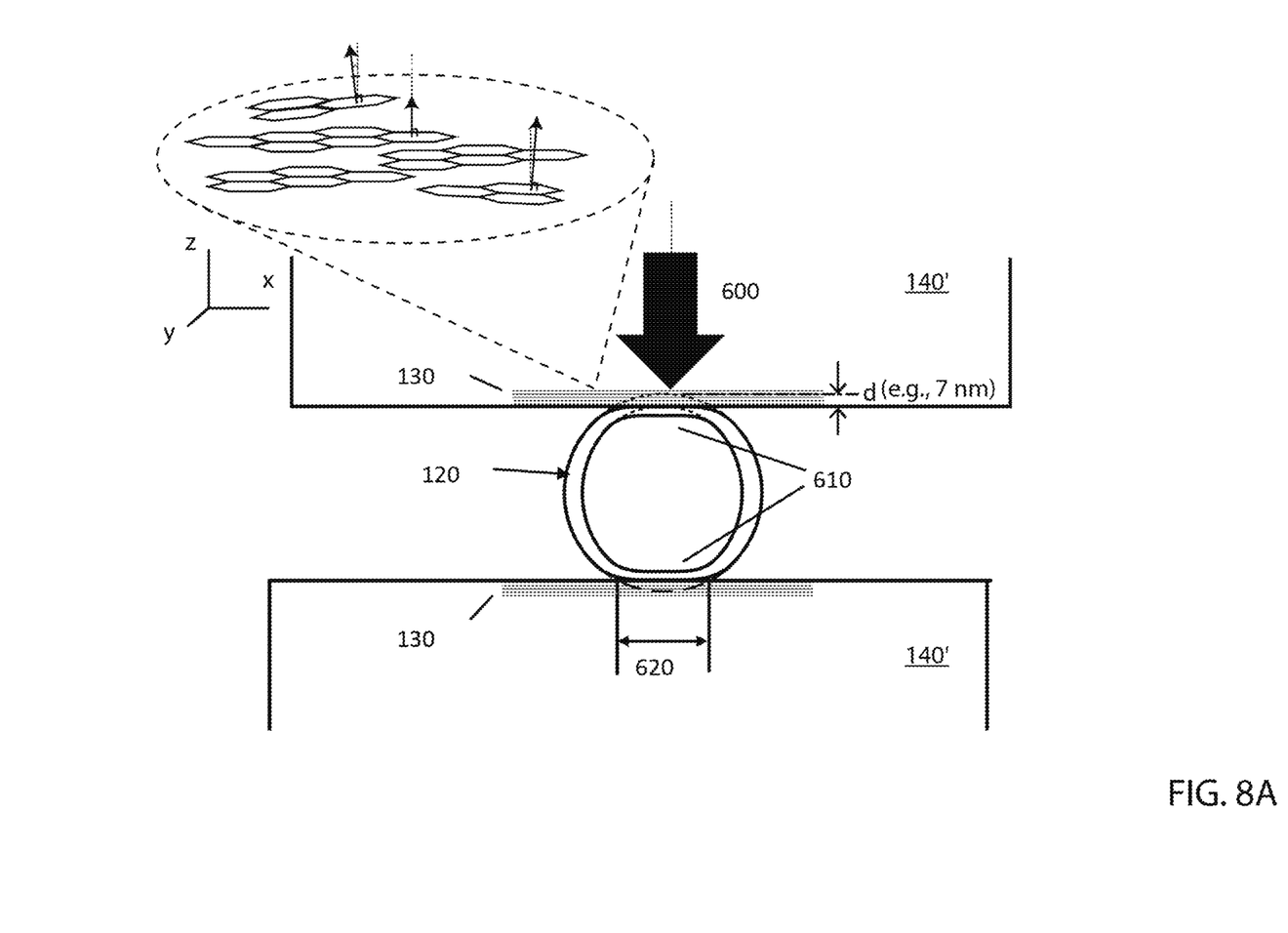
FIGS. 8A-8C depict systems according to the invention in which blocks of aggregate medium are stacked, and in which fluid transport vias disposed between the blocks bear at least some of the stacking weight, causing elastic deformations that improve heat transfer from the vias to the aggregate medium.

FIG. 8A illustrates a configuration of pre-formed blocks 140' that are stacked upon one another with a via 120 disposed in between such that the force (i.e., weight) of the upper block 140' on the via 120 increases its contact area through deformation in the area of contact. In that drawing, arrow 600 represents the force per unit length exerted by gravity. The contact width, 2a, is labelled 620. The depth of penetration, d, varies depending on equations (1)-(4) but should be at least 7 nm to obtain good contact. From equation (3), with 7 N/m of applied force 600, and at least 7 nm of penetration, the combined elastic modulus, E*, must be less than 1.27 GPa. For a via with radius 3 mm on a flat surface (infinite radius), equation (1) gives a combined radius of 3 mm. Then from equation (4), the resulting width, 2a, is 9 microns for the 7 nm penetration.

The illustration in FIG. 8A shows how the region of deformation 610 can be concentrated largely in the via 120 when the elastic modulus of the via, $E_1$, is substantially less than the elastic modulus of the surface $E_2$. From equation (2) the combined modulus, E*, will be approximately $E_1$ and the deformation with occur in the via.

The preformed blocks 140' of storage media depicted in FIG. 8A include heat spreader layers 130 that are incorporated into those blocks (e.g., so as to form unitary structures therewith), though other embodiments may vary in this regard. The graphical inset and axes provided in the upper left of FIG. 8A also highlights that in the region of the blocks 140' in vicinity of the surfaces that press against the via 120 over 50% of the graphite planes (i.e., the planar six-membered hexagonal rings of carbon atoms of which the graphite is largely comprised) have normals oriented in parallel with a direction against which the fluid transport via presses against that external surface—in this case in parallel with the force vector 600.

Figure 8B:
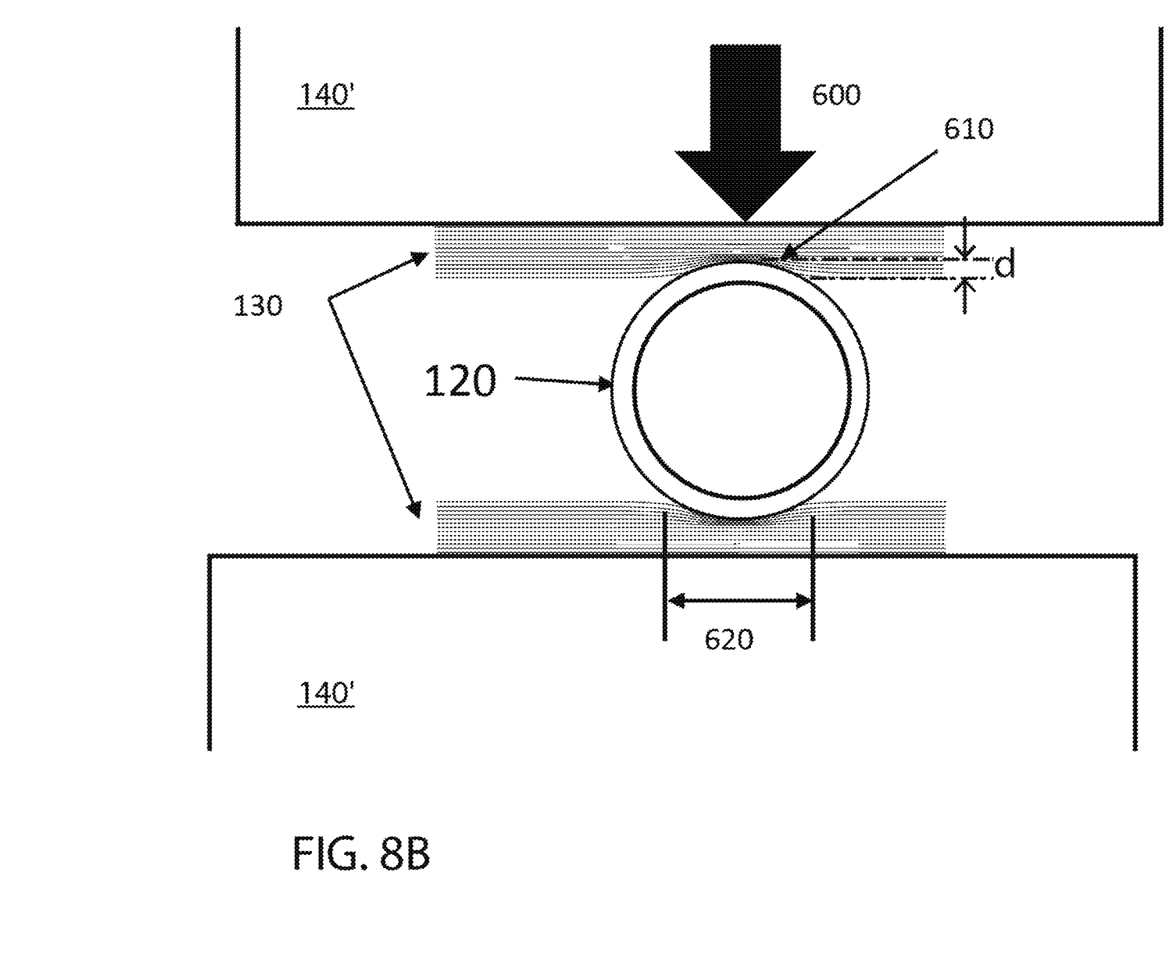

FIG. 8B parallels FIG. 8A, albeit, in a configuration in which the heat spreader layers 130 are not incorporated into the pre-formed aggregate medium blocks 140' but, rather, are disposed on them. Again, the applied weight 600 compresses the graphite layer 130 into the via 120. But in this case the deformation penetration d, is largely concentrated in the graphite layer 130. The occurs when $F_2$, the elastic modulus of the graphite is substantially less than $E_1$, the elastic modulus of the via.

Figure 8C:
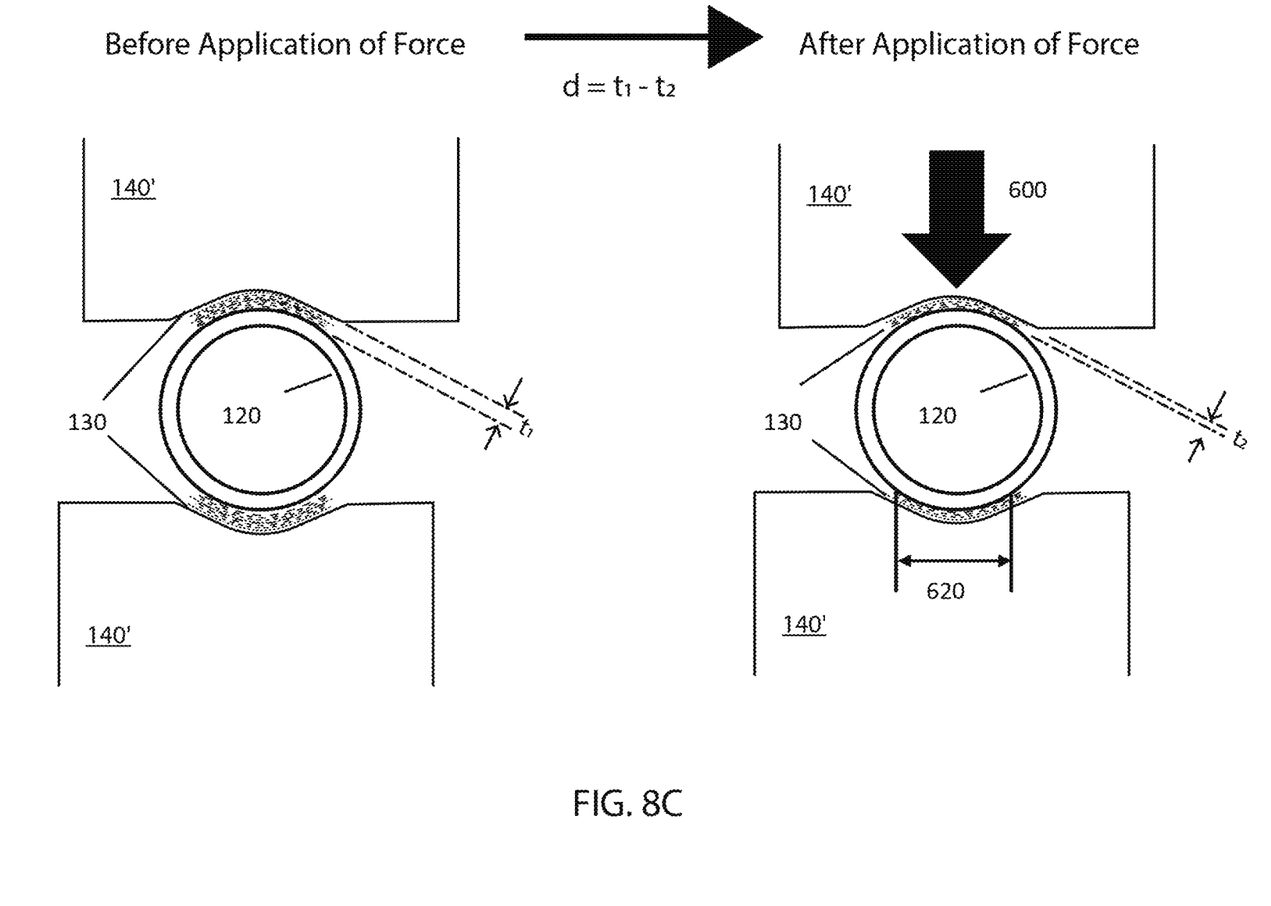

A further configuration is illustrated in FIG. 8C where the surface of the storage material is no longer flat, but instead has a radius. In this case the displacement d is given by:

$$d/t = F/(LwE) \quad (5)$$

Where t is the thickness of the material, d is the compression distance, F is the applied force, L is the length, w is the width and E is the elastic modulus.

For the geometry illustrated in FIG. 8C with the contact width 620 comparable to the via radius of 3 mm, and with a graphite layer of also approximately 3 mm, the applied force of 7 N/m will result in a displacement d of at least 7 nm with the combined compliance, E*, of less than 1 GPA. The force per length 600 in the configurations of FIGS. 8A-8C can arise from, for example, an external fixture or the gravitational force on the brick.

Figure 9A:
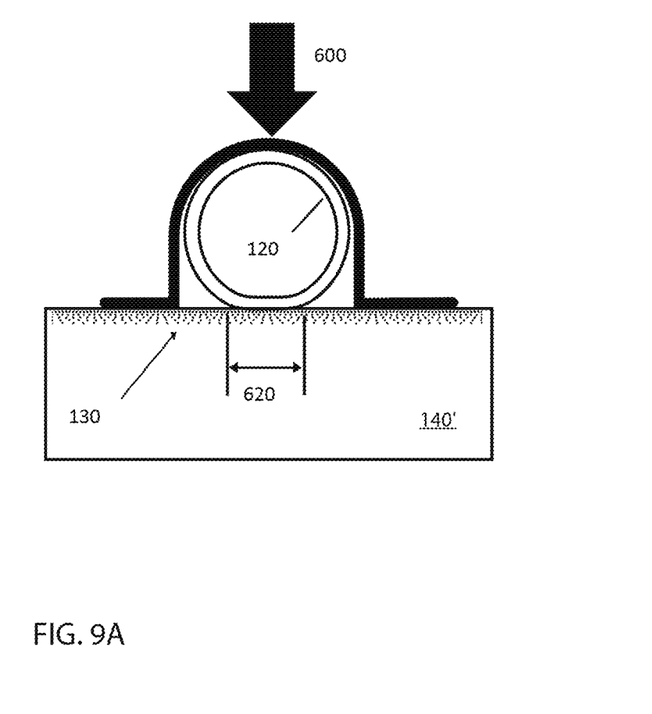
FIG. 9A-9B depict systems according to the invention in which clamps press fluid transport vias against the aggregate medium, causing elastic deformations that improve heat transfer from the vias to the aggregate medium.
Figure 9B:
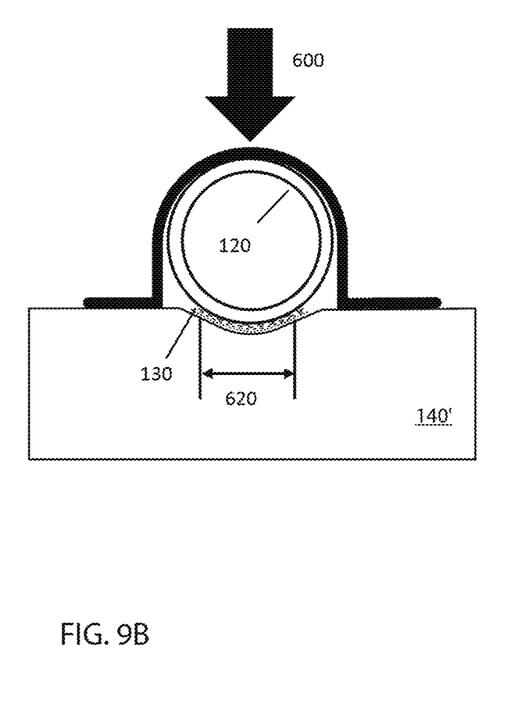

FIGS. 9A and B illustrate the same principles of deformation as discussed above when the via is attached to a single storage block and the force is applied via a clamp.

Advantages of heat stores according to the invention is that they use graphite to improve the heat transfer from the contact surface of the storage medium block 140' to the bulk of the storage material 140 in that block. When graphite is uniformly distributed in a material it will generally improve the bulk thermal conductivity. But the improvement is on the order of just a few percent until the concentration of graphite exceeds 10%. For energy storage applications, the large quantity of graphite required to reach 10% is often cost prohibitive.

Systems according to the present invention distribute graphite in the storage media in a non-uniform way, thereby, achieving improved heat transfer from the block 140' contact surface to the bulk of the block's body, without requiring large amounts of graphite. Specifically, the embodiments of FIGS. 8A-8C and 9A-9B result in an increase by at least 50% of an aggregate rate of heat transfer between portions of the blocks 140' external surfaces and the remainders (i.e., bodies) those blocks, where that aggregate rate of heat transfer is aggregated over an entire volume of the first block.

Thus, in the embodiments of FIGS. 8A-8C and 9A-9B, the graphite is distributed as a thin layer 130 near the regions of contact with the via 120. In addition to concentrating the graphite 130 near the vias 120, the graphite is also prepared so that—as noted above—the majority of the graphite planes are oriented so that the normal vectors of the planes lie perpendicular to the surface. In one embodiment, this configuration is obtained by compressing expanded graphite onto the surface of the storage material. By aligning the graphite planes in this way, the thermal conductivity in plane is increased at the expense of the out of plane thermal conductivity. The observed gain in the thermal conductivity from the surface contacting the via to the bulk material exceeds 50% with less than 10% of the mass of the storage brick comprised of graphite.

Described above and illustrated in the drawings are thermal energy stores and methods of operation meeting the objects set forth previously, as well as system incorporating those stores and using those methods. It will be appreciated that the illustrated embodiments are only examples of the invention and that other embodiments differing from those shown and described herein are encompassed by the invention, as well. Thus, for example, while the embodiments of FIGS. 8A-8C comprised stacked storage medium blocks 140' with fluid transport vias disposed therebetween, other embodiments may utilize side-by-side or other adjacent arrangements of blocks 140' to the same effect (e.g., so long as those arrangements provide for the application of force to effect deformations as discussed above) without deviating from the principles hereof.

In view of the foregoing, what I claim is:

1. A thermal storage system, comprising:
    A. a first block consisting essentially of (i) a bonded aggregate material, and (ii) between 0.01% and 10%, by weight, of graphite, wherein the bonded aggregate material consists essentially of sand and one or more of silicate binder systems, wherein the one or more silicate binder systems include any of sodium metasilicate, potassium metasilicate, lithium metasilicate, and an alkali activated geopolymer,
    B. a fluid transport via disposed on or adjacent at least a portion of an external surface of the first block and in thermal coupling therewith, wherein fluid transport via presses against the first block with a force of at least 7 Newtons per meter,
    C. wherein the graphite is disposed adjacent to at least said portion of said external surface so as to increase by at least 50% an aggregate rate of heat transfer between that portion of the external surface and a remainder of the first block.

2. The thermal storage system of claim 1, wherein the aggregate rate of heat transfer is aggregated over an entire volume of the first block.

3. The thermal storage system of claim 1, wherein E*, a combined elasticity of the first block and fluid transport via, is less than 1.2 GPA, is defined by the relation:

$$\frac{1}{E^*} = \frac{1-v_1^2}{E_1} + \frac{1-v_2^2}{E_2}$$

where,
$v_1$ is the Poisson ratio for the via,
$v_2$ is the Poisson ratio for the storage block measured at the external surface in contact with the via,
$E_1$ is the elastic modulus of the via,
$E_2$ is the elastic modulus of the storage block measured at the external surface in contact with the via.

4. The thermal storage system of claim 1, an aggregate contact deformation distance of the first block and the fluid transport via is at least 7 nm.

5. The thermal storage system of claim 1, wherein at least 25% by weight of the graphite is disposed within 10% by volume of one or more regions of the first block in vicinity of one or more respective external surfaces of the first block against which one or more fluid transport vias are disposed.

6. The thermal storage system of claim 1, wherein the first block comprises a mixture of (i) the bonded aggregate material, and (ii) between 0.01% and 10%, by weight, of graphite having a pre-mix density of 0.1 to 2.0 g/cm^3.

7. The thermal storage system of claim 1, wherein the first block comprises (i) the bonded aggregate material, and (ii) between 0.01% and 10%, by weight, of graphite having an elastic modulus less than 1 GPa.

8. The thermal storage system of claim 1, wherein
    (i) the graphite in the first block comprises over 50% planar six-membered hexagonal rings of carbon atoms, and
    (ii) in a region of the first block adjacent to the external surface of that block against which the fluid transport via is disposed, over 50% of said planar rings have normals oriented in parallel with a direction of the force against which the fluid transport via presses against that external surface.

9. The thermal storage system of claim 1, wherein the bonded aggregate materials is hardened by carbon dioxide or dehydration from heat or microwaves.

10. The thermal storage system of claim 1, wherein the fluid transport via comprises stainless steel.

11. A thermal storage system, comprising:
    A. a plurality of blocks, each consisting essentially of (i) a bonded aggregate material and (ii) between 0.01% and 10%, by weight, of graphite, wherein the bonded aggregate material consists essentially of sand and one or more of silicate binder systems, wherein the one or more silicate binder systems include any of sodium metasilicate, potassium metasilicate, lithium metasilicate, and an alkali activated geopolymer,
    B. at least pairs of the plurality of blocks being disposed adjacent one another, with one or more fluid transport vias disposed between those adjacent blocks on or adjacent to a portion of respective external surfaces of those adjacent blocks,
    C. where the one or more of the fluid transport vias press against the blocks between which the one or more of the fluid transport vias are disposed with a force of at least 7 Newtons per meter,
    D. wherein the graphite of which each of the plurality of blocks is comprised is disposed adjacent to the portion of the external surface of that block against which the fluid transport via presses so as to at least double an aggregate rate of heat transfer between the fluid transport via and that block.

12. The thermal storage system of claim 11, wherein the aggregate rate of heat transfer between the fluid transport via and a said block is a rate of heat transfer aggregated over an entire volume of that block.

13. The thermal storage system of claim 11, wherein E*, a combined elasticity of the each of said blocks and fluid transport via that presses against it, is less than 1 GPA, is defined by the relation:

$$\frac{1}{E^*} = \frac{1-v_1^2}{E_1} + \frac{1-v_2^2}{E_2}$$

where,
$v_1$ is the Poisson ratio for the via,
$v_2$ is the Poisson ratio for the storage block measured at the external surface in contact with the via,
$E_1$ is the elastic modulus of the via,
$E_2$ is the elastic modulus of the storage block measured at the external surface in contact with the via.

14. The thermal storage system of claim 11, an aggregate contact deformation distance of a said block and a said fluid transport that presses against it is at least 7 nm.

15. The thermal storage system of claim 11, wherein at least 25% by weight of the graphite of which a said block is composed is disposed within 10% by volume of one or more regions of that block in vicinity of one or more respective external surfaces of that block against which one or more fluid transport vias are disposed.

16. The thermal storage system of claim 11, wherein the blocks comprise a mixture of (i) the bonded aggregate material, and (ii) between 0.01% and 10%, by weight, of graphite having a pre-mix density of 0.1 to 2.0 g/cm^3.

17. The thermal storage system of claim 11, wherein the blocks comprise (i) the bonded aggregate material, and (ii) between 0.01% and 10%, by weight, of graphite having an elastic modulus less than 1 GPa.

18. The thermal storage system of claim 11, wherein
   (I) the graphite in a said block comprises over 50% planar six-membered hexagonal rings of carbon atoms, and
   (ii) in a region of that bock adjacent to a said external surface of that block against which a said fluid transport via presses, over 50% of said planar rings have normals oriented in parallel with a direction of the force against which that fluid transport via presses against that external surface.

19. The thermal storage system of claim 11, wherein the bonded aggregate materials is hardened by carbon dioxide or dehydration from heat or microwaves.

20. The thermal storage system of claim 11, wherein the fluid transport via comprises stainless steel.

21. A thermal storage system, comprising:
   A. a block consisting essentially of a bonded aggregate material and between 0.01% and 10%, by weight, of graphite, wherein the bonded aggregate material consists essentially of sand and one or more of silicate binder systems, wherein the one or more silicate binder systems include any of sodium metasilicate, potassium metasilicate, lithium metasilicate, and an alkali activated geopolymer,
   B. one or more fluid transport vias disposed in a plane any of on, adjacent to, or in the first block and in thermal coupling therewith,
   C. a plurality of perforations that extend through the block obliquely to the plane of the fluid transport vias, and
   D. wherein at least two of the perforations are in fluid coupling with one another.

22. The thermal storage system of claim 21, comprising one or more end caps that are coupled to the block and that are in fluid coupling with two or more of the perforations.

23. The thermal storage system of claim 22, wherein the endcaps are U-shaped tubes.

24. The thermal storage system of claim 21, wherein the graphite is concentrated adjacent to said plane.

25. The thermal storage system of claim 21, wherein the perforations facilitate heat transfer by any of conduction and convection.

26. The thermal storage system of claim 21, wherein the perforations are fluid-filled.

27. The thermal storage system of claim 21, wherein the fluid is air or flue gas.

* * * * *